Aug. 3, 1926.
W. G. CLARK
1,594,496
ELECTROFINING GLASS FURNACE
Filed April 6, 1920 3 Sheets-Sheet 3
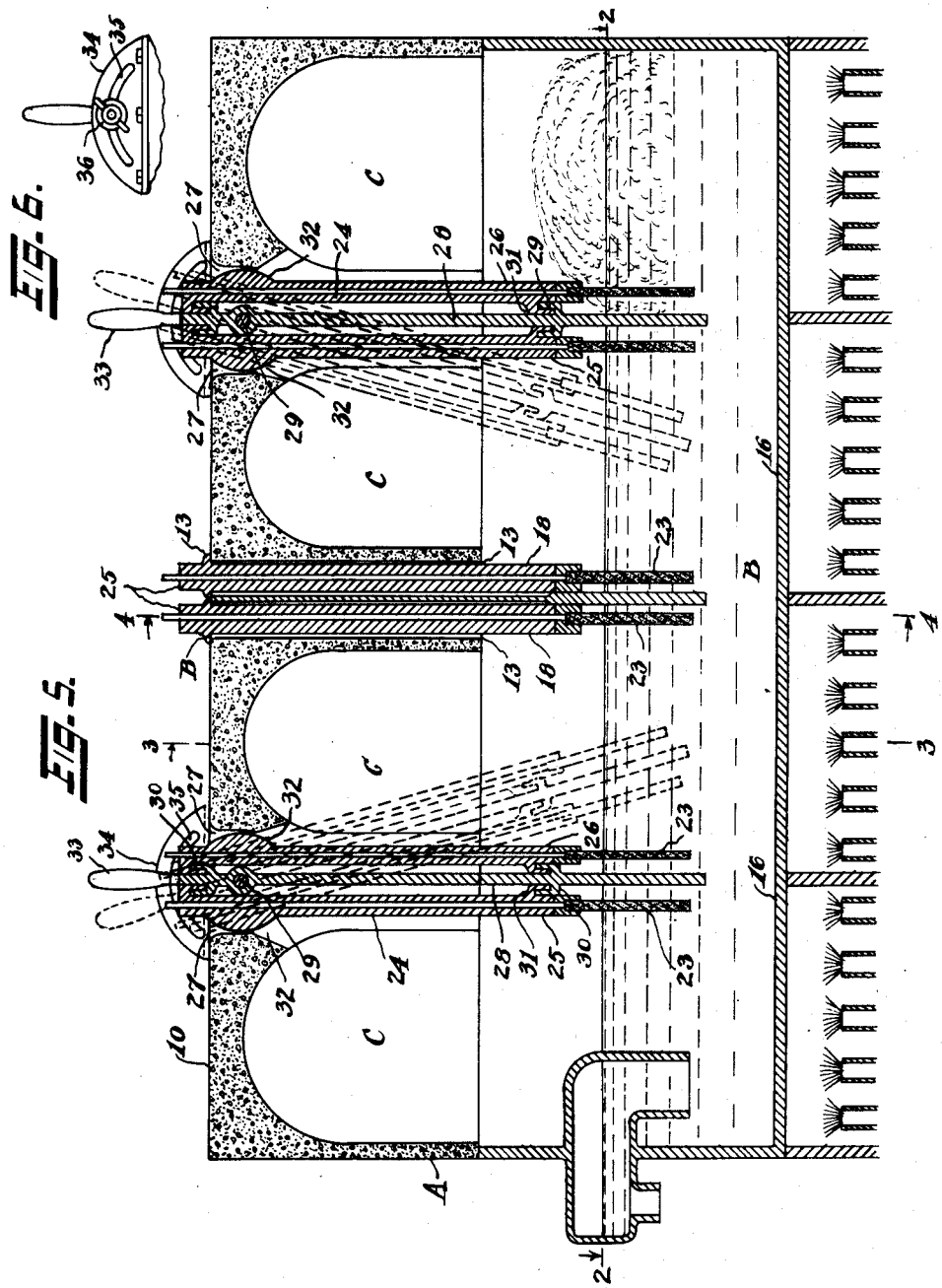
Witnesses:
L. C. Badeau
H. D. Penney
Inventor:
Walter G. Clark,
By his Att'y, Patented Aug. 3, 1926.

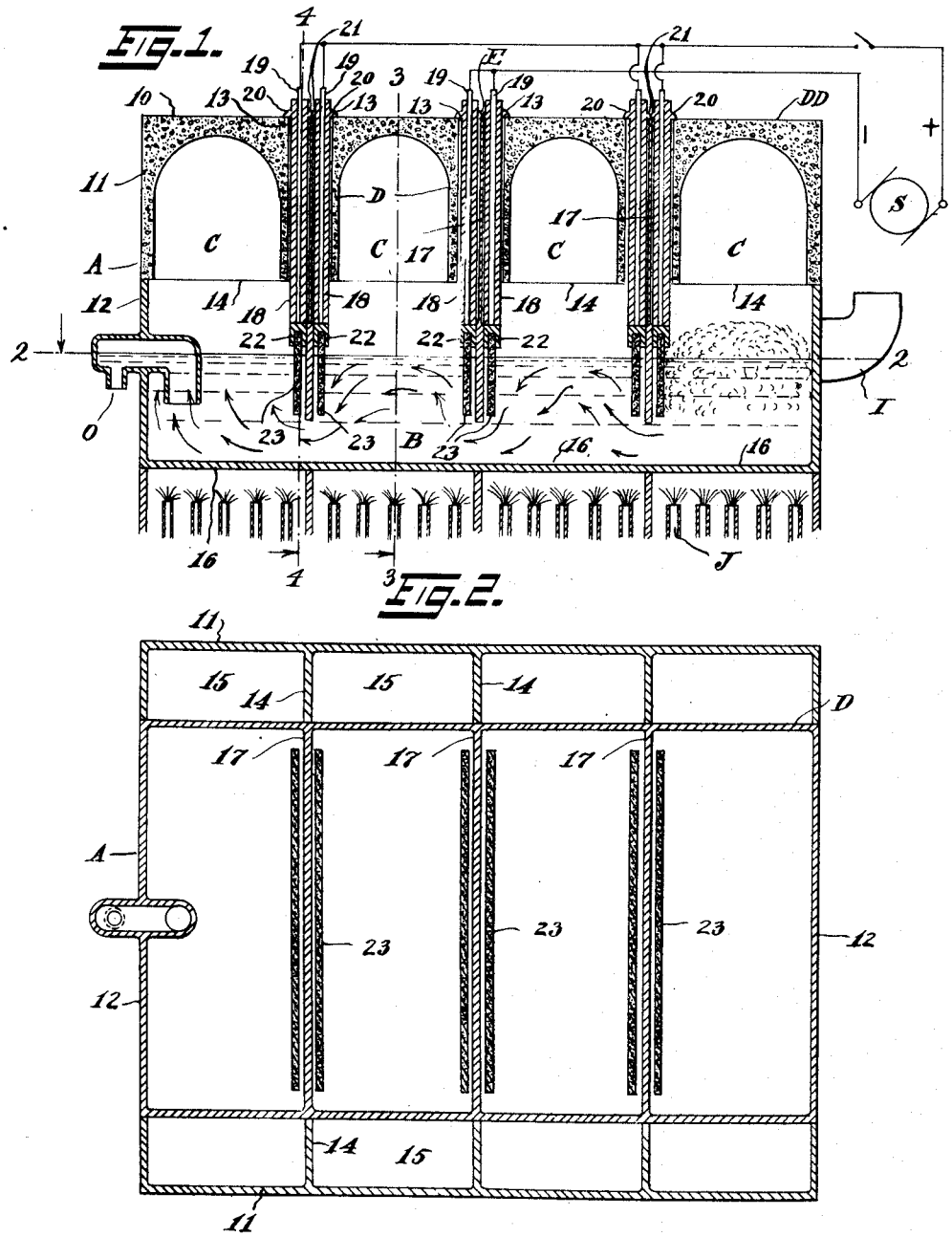

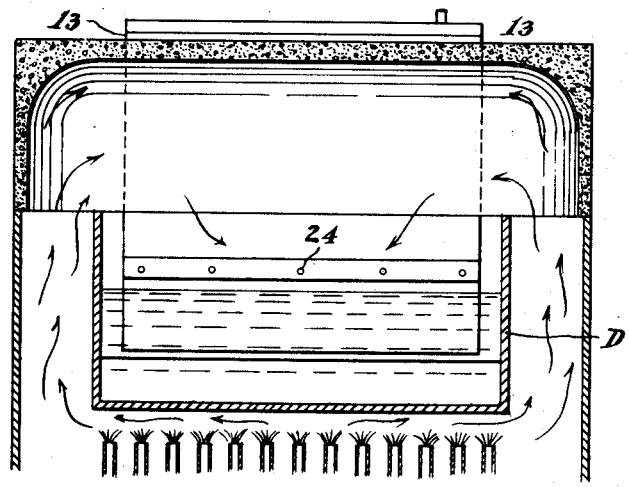
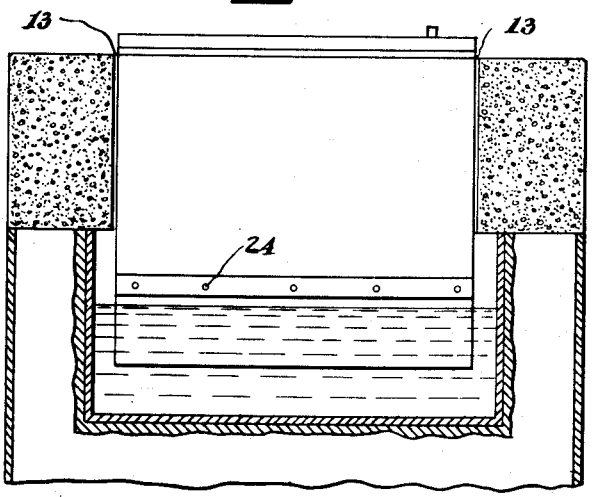

1,594,496

UNITED STATES PATENT OFFICE.

WALTER G. CLARK, OF NEW YORK, N. Y.

ELECTROFINING GLASS FURNACE.

Application filed April 6, 1920. Serial No. 371,699.

This invention relates to an electrical heating apparatus for glass furnaces of the usual type wherein the glass is melted in the usual manner by means of any suitable fuel, such as gas, etc., and a feature of my invention is that in the fining section or zones thereof I arrange a plurality of heat-introducing elements for adding further heat to the mass for the purpose of holding the said glass in said fining section or zones in a true molten state to permit the clearing out of all impurities, bubbles, etc., for causing a true melting of the mass and for maintaining such glass mass in true molten state until the fining thereof is completed.

A further feature of my invention is that this added heating means or elements, comprises an electrical circuit having a plurality of electric current introducing means whereby a current is introduced into the molten glass mass by one terminal and the current passes through the molten glass from said terminal to an associated terminal adjacent thereto but of unlike polarity.

The current in passing through the molten glass mass heats the same and causes it to remain in molten state, permitting the settling and fining of the glass, to take place automatically.

A further feature of my invention is that advantage is taken of the fact that glass while dielectric in its cold state, becomes conductive when in its molten state, and the conductivity of molten glass increases in certain ratios up to the point of dissolution of the component elements thereof into gases by the subjection of the glass mass to extremely high temperatures.

It has been found in practice that the conductivity of molten glass varies as to constituents of the various kinds of glass, and, therefore, the resistance gap between the conductive electrical terminals must be regulated in order that conductivity of the current from one terminal to another may be incurred to the limit of the conductivity of the molten mass being treated. Therefore, to this end, I so arrange the co-operating terminal members of like and unlike polarity that they may be adjusted at the terminal ends toward or away from one another in order to increase or decrease the resistance gap therebetween to the limit of the molten mass being thus treated.

It has been found immaterial to a certain extent as to what particular form the electrical conducting terminals may take, and the shapes, contours and other elements of like constructional nature may be modified to suit the glass furnace in which the mass is being treated. Sufficient current to supply the molten glass under treatment with the proper amount of current in proper quantities to induce and prolong the molten condition, may be supplied from any suitable source, but in the present instance, as shown in the diagrammatic view, the source may be of any conventional kind, such as the well known generator.

A further feature of my invention is that I provide a main or fining chamber communicating with a series of chambers, the chambers comprised in the series having electric terminal or electrode-carrying means located between the chambers for providing an electric circuit through the molten glass in the main or fining chamber.

A further feature of my invention is that I provide a main or fining chamber communicating with a series of chambers, the chambers comprised in the series having located between the chambers means for carrying positive electric terminals or electrodes, and means for carrying negative electric terminals, for providing an electric circuit through the molten glass in the main or fining chamber, such means for carrying being regulatable to increase or decrease the resistance gap between the positive and negative terminals or electrodes in the molten glass in the main or fining chamber.

In the matter of supplying current for the fining method or process, it has been ascertained that direct current is not entirely satisfactory for the herein purposes. It has also been ascertained that alternating current of extremely low frequency is also not entirely satisfactory for the purpose, and the reason therefor is due to the fact that direct current and low frequency alternating current tend to decompose the oxides of the glass into their metallic forms.

It has been ascertained, however, that high frequency alternating current performs the functions herein satisfactorily and that no decomposition occurs with alternating current at or about 60 cycles, or higher.

In the accompanying drawings forming part of this specification,

Figure 1 is a central longitudinal view of my apparatus, also showing diagrammatically an electric generator or source of supply and connections for use with my apparatus.

Fig. 2 is a cross-sectional plan view on the line 2—2 of Fig. 1, in the direction of the section line arrow.

Fig. 3 is a vertical section on the line 3—3 of Fig. 1, in the direction of the section line arrow.

Fig. 4 is a fragmentary vertical section on the line 4—4 of Fig. 1. in the direction of the section line arrow.

Fig. 5 is a central longitudinal section view, on a larger scale than the other figures, of a preferred form of my invention.

Fig. 6 is a fragmentary detail view of a guiding and locking means employed in said preferred form.

Similar characters or numerals refer to similar parts through the several views.

My invention comprises an enclosing means or case A, preferably of metal, a main or fining chamber B, a series of chambers CC communicating therewith, and electric terminal or electrode-supporting means generally denoted by D.

The enclosing means or case A is provided with a roof or cover 10, side walls 11, and end walls 12. The roof or cover 10 has therein transverse openings or slots 13, Figs. 1, 3, 4 and 5, the purpose of which is hereinafter stated, the ends of the slots 13 being spaced a distance from the side walls.

The main or fining chamber B extends longitudinally of the apparatus, full way of the apparatus, and extends transversely part way of the apparatus, being spaced from the side walls 11 by partitions or ribs 14 extending upwardly from the bottom of the chamber B to the chambers CC and forming heat flues 15 into the chambers CC, the partitions or ribs 14 terminating above the normal surface level of the molten glass in the chamber B and at the lower ends or bottom lines of the chambers CC. The bottom 16 of the main or fining chamber B preferably is the bottom of the enclosing means or case A, the heating means indicated by the jets J being in heating contact with the bottom 16. The main or fining chamber B is provided with means, such as indicated, by I, for introducing the glass to be fined, and with outlet means therefor, such as indicated by O.

The chambers CC extend transversely of the enclosing means or case A, full way thereof, being formed or separated from each other by metal partitions or ribs 17, which extend downwardly from the top 10 of the enclosing means or case A and terminate in the main or fining chamber B, with space between the lower ends of the partitions or ribs 17 and the bottom 16 of the chamber B to allow of passage of molten glass between said ends and said bottom, the purpose of the extension of the partitions or ribs 17 below the upper line of the partitions or ribs 14 being hereinafter stated. The chambers CC afford heat chambers additional to the main or fining chamber B and provide between them space for the supporting members later mentioned.

The electric terminal or electrode supporting means D comprises supporting members 18, of any suitable insulating material, adapted for insertion in the slots 13 of the roof or cover 10, and sufficiently strong for the purpose intended. The supporting members 18 are bored or otherwise arranged to receive conduits 19 or other means by which electricity may be conducted. The upper ends of the supporting members 18 are provided with shoulders 20 and 21, the intention being that when a supporting member 18 is inserted or received in the slot 13, and is in operative position therein, the shoulder 20 will bear upon the roof or cover adjacent to the slot, and the shoulder 21 will bear upon the upper edge of the adjacent partition or rib 17, the supporting members 18 being arranged in pairs.

The supporting members 18 extend downwardly into the main or fining chamber B and are provided at their lower ends with recesses 22—22 for receiving the electric terminals or electrodes 23, which preferably are carbon plates, or are of any other material suitable to provide electric terminals or electrodes. The terminals or electrodes 23 are secured in the recesses 22—22 by bolts 24, Figs. 3 and 4 passing through the supporting members and through the terminals or electrodes, or are secured to the supporting members by any other means suitable for the purpose, the terminals or electrodes 23 being separated from each other by the downwardly extending ends of the partitions or ribs 17. Electric current is connected to the supporting members 18 from a generator or source of supply as S by the conduits 19 or by wires or other suitable means, as diagrammatically indicated in Fig. 1.

The supporting members 18 preferably are arranged in the apparatus in series of three thus providing an intermediate pair of supporting members having a pair of supporting members on either side thereof and adjacent thereto.

Positive electric current is conducted from the generator or source S to the outer supporting members 18, and negative electric current is conducted to the intermediate or inner supporting members 18, the currents of the respective supporting members flowing by means of the conduits 19 of the respective supporting members to the electric terminals or electrodes 23 of the respective supporting members.

In operation, the glass is introduced into the main or fining chamber B, preferably in molten form but not yet fined, by means of the inlet and is maintained in molten form, or further reduced by the heating means such as the gas jets J. The outer and intermediate supporting members 18 being in operative position and the electric terminals or electrodes 23 thereof extending into the molten glass in the main or fining chamber B, and the outer and intermediate terminals or electrodes being of unlike polarity, an electric circuit is thus provided through the molten glass between the terminals or electrodes of the outer supporting members 18 and those of the intermediate supporting members 18 by conductivity of the molten glass for affording additional heat to the molten glass directly applied therein and fining and settling the molten glass, which subsequently is drawn off in fined and settled form.

In the drawings the walls of the heat chambers CC as shown provided with material for preventing radiation of heat from the chambers CC through the walls thereof to avoid loss of heat, but in practice such construction while preferable is not essential to effective operation of my apparatus. In practice also the apparatus may be provided in a well known manner with means, not shown, such as hand-holes or suitable closable openings, for removing impurities and waste from the chamber B.

In the preferred form of my invention shown in Fig. 5, the electric terminals or electrodes are arranged in pairs and the pairs are arranged in the same relation to each other as in the first described form of apparatus, that is, in series of three, a pair in each series, to provide an intermediate pair of terminals or electrodes, and an outer pair thereof. In the first described form all the pairs of terminals or electrodes are in a fixed or immovable position. In the preferred form I provide for movement of the outer pair towards or away from the intermediate pair to increase or decrease the resistance gap between the outer pair of terminals or electrodes and the intermediate pair.

To the accomplishment of this purpose the intermediate terminals or electrodes are supported by means identical with the means for supporting the intermediate terminals or electrodes in the first described form of apparatus. But the outer terminals or electrodes are supported by means generally denoted by 24, Fig. 5, comprising a terminal or electrode carrying member 25 and a complementary terminal or electrode carrying member 26, the members 25 and 26 being maintained in operative position in transverse slots 27 in the roof or cover 10 by carrier-supporting members 28, the upper ends of the members 25 and 26 projecting through said slots, and the slots being of sufficient width to allow swinging movement of these ends. In material or composition the terminal or electrode carrying members 25 and 26 are the same as the supporting members 18 before mentioned, and in construction they are the same, except that they are provided with rounded head portions and supporting brackets later described, and are constructed without shoulders such as 20 and 21 of the supporting members 18. The carrier supporting members 28 are pivoted or hung near their upper ends upon rods or shafts 29, secured or seated at their ends in the side walls 11 of the apparatus, the carrier supporting members 25 and 26 extending into the main or fining chamber B and separating the terminals or electrodes 23, as in the case of the partitions or ribs 17 of the first described form of apparatus, and also forming partitions between the heat chambers CC which are movable or capable of being swung in the arc of a circle. The carrier supporting members 28 are provided with upper and lower upturned brackets 30 with which upper and lower downturned brackets 31 of the carrier members 25 and 26 engage, for supporting the members 25 and 26 and providing for swinging movement of these members with the carrier-supporting member 28, the head portions 32 of the carrier members 25 and 26 fitting freely but closely the slots 27 to prevent loss of heat therethrough, and the side wall 11 adjacent to the head portions being cut away to afford clearance space for movement of the head portions. The carrier supporting members 28 are provided with operating handles 33 extending through and above the roof or cover 10, for swinging the supporting members upon the rods or shafts 29. Upstanding segmental plates 34 are secured to the roof or cover 10 adjacent to the handles 33 by bolts or other suitable means, the plates 34 being provided with segmental slots 35 in which wing-bolts 36, cooperating with the handles 33 engage for fixing or locking the supporting members 28, and the carrying members 25 and 26, in a position to which they may be moved or swung by means of the handles 33.

The outer terminal or electrode carrying members 25 and 26 are provided with terminals or electrodes 23, and are electrically connected to the generator or source of supply S, the same as the outer terminals or electrodes 23, of the first described form of my invention. The intermediate terminals or electrodes 23 being supported and electrically connected, and being fixed or immovable the same as in the first described form, it is readily seen that by means of the above described movable terminal or electrode carrying members having terminals or electrodes electrically connected the same as the outer terminals or electrodes in my first described form, I am enabled to provide an electric circuit through the molten glass in the chamber B by conductivity of the molten glass, and to increase or decrease the resistance gap of this circuit.

Having thus described my invention, it should be understood that there may be modifications thereof and variations therein without departing from the spirit of the invention or exceeding the scope of the appended claims.

I claim:

1. The combination in a furnace of the class described having a fining zone, of means for maintaining the glass in molten condition in the fining zone by heat other than electric, and means located within the molten mass of glass within the fining zone for introducing electric current through said glass, said last means being adjustable so as to vary the amount of electric current passing through said glass.

2. In an apparatus for fining glass having a fining zone, the combination of means for maintaining in molten state in the fining zone by heat other than electric glass making material that has been reduced to molten glass by heat other than electric, a source of alternating current, means for introducing said alternating current through said molten glass, and means whereby to variably control the amount of current so introduced.

3. In an apparatus for fining glass having a fining zone, the combination of means for maintaining in molten state in the fining zone by heat other than electric glass making material that has been reduced to molten glass by heat other than electric, a plurality of electric terminals spaced apart in said molten glass and movable for varying the space between the electric terminals in the molten glass, and means for supplying electric current to the terminals.

4. The combination with a furnace of the class described having a melting zone and a fining zone, of means for reducing glass forming material to molten state and maintaining said material in molten state in the melting zone by heat other than electric, a plurality of electric terminals spaced apart in the molten glass in the fining zone, means for supporting the electric terminals in the molten glass in the fining zone, and means for supplying electric current to said terminals.

5. A method of fining glass consisting in first bringing the glass to a molten state and then, during the fining operation, introducing current through said molten mass, said current being introduced into the mass of said molten glass by means of a pair of spaced electric terminals introduced into said mass and gradually increasing the distance between said electric terminals whereby to maintain a relative electrical conductivity in the glass mass as the temperature, and therefore the conductivity, of such glass increases.

6. The combination with a furnace of the class described having a melting zone and a fining zone, of means for reducing glass forming material to molten state in the melting zone by heat other than electric, a plurality of electric terminals spaced apart in the molten glass in the fining zone, means for supporting the electric terminals in the molten glass in the fining zone, and means for supplying electric current to said terminals; said supporting means being movable for varying the space between said electric terminals in the molten glass.

7. The combination with a furnace of the class described having a melting zone and a fining zone, of means for reducing glass forming material to molten state and maintaining said material in molten state in the melting zone by heat other than electric, a plurality of electric terminals spaced apart in the molten glass in the fining zone, and means for supplying electric current to said terminals; said supporting means being movable for varying the space between said electric terminals in the molten glass.

WALTER G. CLARK.